United States Patent [19]

Woodliff et al.

[11] 4,324,424
[45] Apr. 13, 1982

[54] SLIP-TYPE CONDUIT HUB FOR ENCLOSURES

[75] Inventors: Ronald D. Woodliff, Milwaukee; Kenneth L. Paape, Mequon; Edwin S. Johnston, New Berlin, all of Wis.

[73] Assignee: Allen-Bradley Company, Milwaukee, Wis.

[21] Appl. No.: 106,590

[22] Filed: Dec. 26, 1979

[51] Int. Cl.³ .............................................. F16L 3/04
[52] U.S. Cl. ................................... 285/158; 285/200; 285/330; 285/354; 174/65 R
[58] Field of Search ............... 285/158, 161, 200, 205, 285/206, 208, 222, 328, 330, 354, 387, 388, 321, DIG. 7, 128, 129; 174/65 R, 65 SS

[56] References Cited

U.S. PATENT DOCUMENTS

| | | |
|---|---|---|
| 2,427,260 | 9/1947 | Cowles . |
| 2,726,104 | 12/1955 | Boitnott et al. ................ 285/354 X |
| 2,826,436 | 3/1958 | Hupp et al. ......................... 285/158 |
| 2,907,590 | 10/1959 | Oswald . |
| 3,512,807 | 5/1970 | Moran ................................ 285/158 |
| 3,659,880 | 5/1972 | Goldsobel . |
| 3,747,960 | 5/1972 | Bawa . |
| 3,750,084 | 7/1973 | Gardner . |
| 3,764,169 | 10/1973 | St. Clair ............................. 285/354 |
| 3,869,153 | 3/1975 | De Vincent et al. ........... 285/158 X |
| 3,999,781 | 12/1976 | Todd .................................. 285/354 |
| 4,224,464 | 9/1980 | Bunnell et al. ................. 285/161 X |

FOREIGN PATENT DOCUMENTS 1253390  1/1961  France ......................... 285/DIG. 7

*Primary Examiner*—Dave W. Arola
*Attorney, Agent, or Firm*—Arnold J. Ericsen

[57] ABSTRACT

An assembly for connecting a tubular conduit to an apertured wall of a non-metallic enclosure including a tubular insert seated in the aperture and a threaded, rotatable, hollow hub member arranged to be received by an externally projecting portion of the tubular insert. The closed end of the hub member adjacent the enclosure rests against a compressible resilient ring for sealing engagement and being further adopted for rotatable engagement with respect to the enclosure by means of an interposed washer made of a material having relatively low coefficient of friction with respect to the hub member. The components of the assembly are held together by means of a laterally extending lip formed at the distal end of the insert after assembly of the cooperating elements to the enclosure.

3 Claims, 3 Drawing Figures

SLIP-TYPE CONDUIT HUB FOR ENCLOSURES

BACKGROUND OF THE INVENTION

1. Field of the Invention

This invention relates to means of connecting a tubular conduit, such as conduit bearing electrical conductors, to an enclosure for housing an electrical device, and wherein the enclosure is of a non-metallic material.

2. Description of the Prior Art

Electrical devices have long been housed in enclosures of various types. It has only been in very recent years that such enclosures have been formed from non-metallic materials, such as polymeric molding compounds. Heretofore, it was common practice to provide metallic enclosures of aluminum or zinc die castings. In devices of this type, it was very easy to provide a machined or molded threaded aperture in the wall of the enclosure intended to be connected to a conduit. An externally threaded fitting was placed on the conduit and threaded directly to the enclosure, or in many cases, the conduit would itself be threaded and joined by means of threading engagement directly to the enclosure.

This arrangement, however, is not satisfactory in the case of polymeric enclosures because it introduces an undesirable amount of torque during the installation of the enclosure with respect to the conduit. In addition, it is not uncommon for an installer to preassemble the conduit to the enclosure, and then bend the assembled unit towards a vertical wall for final supporting attachment. This obviously introduces additional stresses at the connection junction of the conduit and enclosure.

SUMMARY OF THE INVENTION

In accordance with the present invention, a slip-type conduit hub or nut is rotatably assembled to an outwardly extending portion of a tubular insert that is seated within an aperture of an enclosure wall formed from a polymeric or other non-metallic material. In order to provide the necessary sealing engagement with the enclosure, a compressible, resilient sealing ring is provided between the end wall of the hollow hub and the supporting enclosure. To permit ease in rotation of the hub during threading engagement with a conduit member, a relatively slippery washer member is provided between the inner wall surface of the hollow hub and a metallic washer at the distal end of the insert. Thus, a desired threading torque between the hub member and the conduit may be developed independently of the enclosure, while maintaining sealing engagement between the enclosure and the conduit. The assembly further permits bending of a conduit member without undue strain exerted upon an enclosure when preassembled to the conduit member.

DETAILED DESCRIPTION OF THE PREFERRED EMBODIMENT

Figure 2:
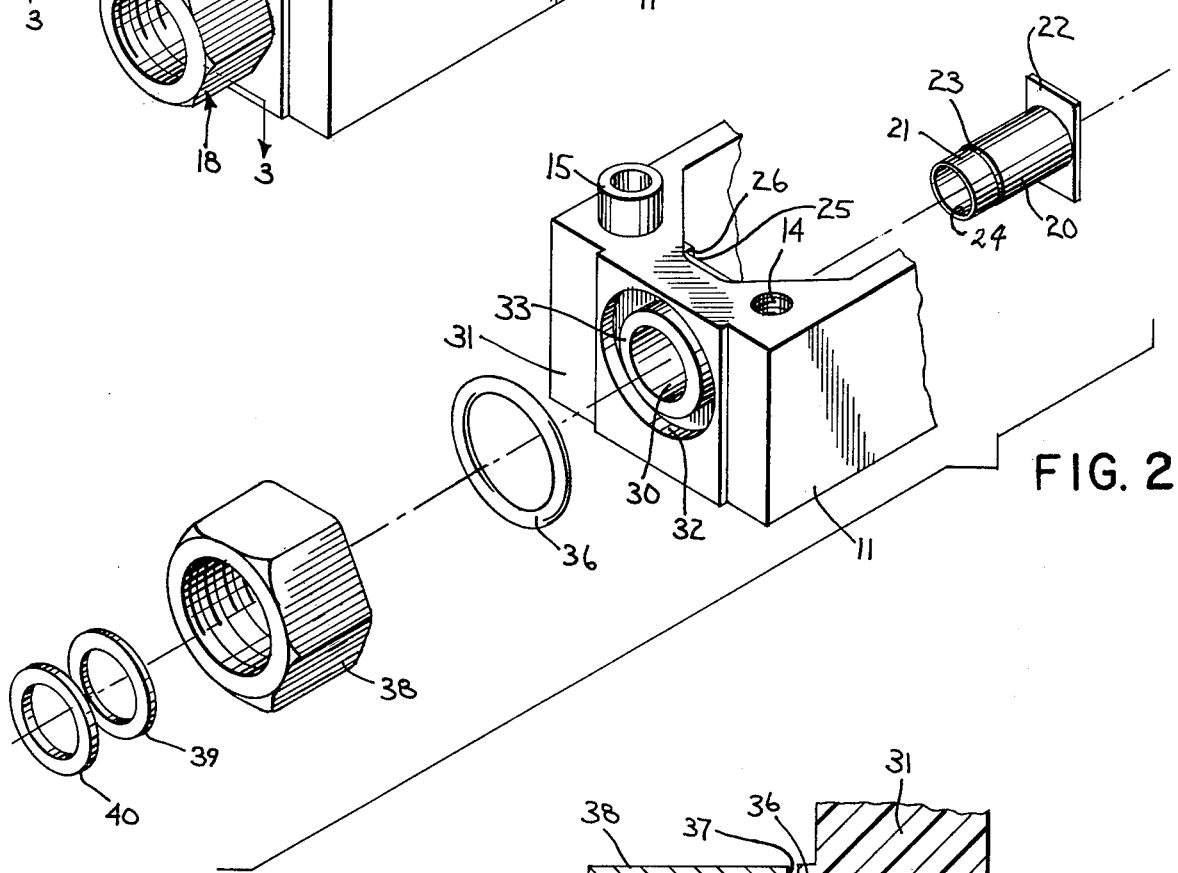
FIG. 2 is an exploded view in perspective indicating the various components comprising the hub assembly of this invention in operating relationship relative to the enclosure.

In the exemplary embodiment of the invention as disclosed in the drawing, an insulating enclosure is generally indicated by the reference numeral 10. The enclosure 10 comprises a base member 11 molded of polymeric material, such as Valox 420 SEO. This material is a thermoplastic polyester which is basically a polybutylene terephthalate which has been glass fiber reinforced. The material is supplied by General Electric Company, Plastics Division, Pittsfield, Mass. A cover member 12 is supplied of the same or similar material. The cover member 12 is fastened to the base member 11 by means of screws (not shown) seated within the counterbored openings 13 of the cover member 12 which are in register with the threaded openings 14 in the base member 11. As shown in FIG. 2, there is an upstanding reinforcing boss 15 molded into the base member 11 which is engageable with a registering re-entrant hole (not shown) formed in the cover member 12.

Figure 1:
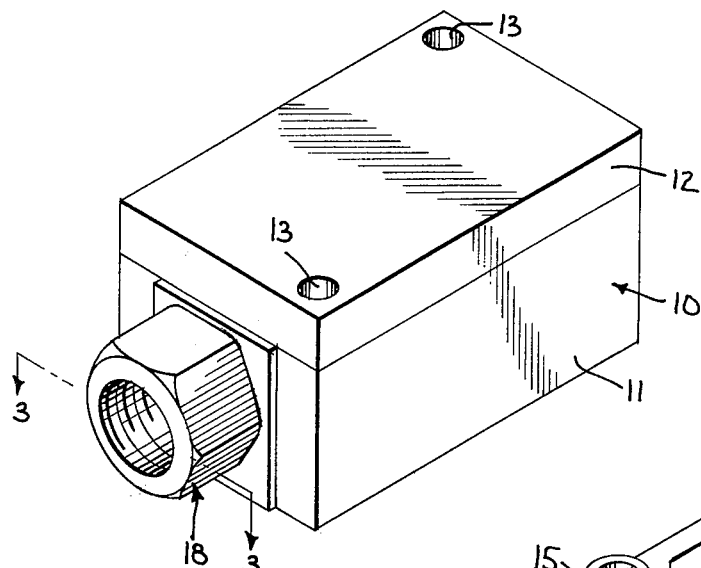
FIG. 1 is a perspective view of an enclosure for electrical components with a slip-type conduit hub assembled thereto in accordance with the teachings of this invention.

Referring again to the view of FIG. 1, the hub assembly is indicated generally by the reference numeral 18. The various components of the hub assembly 18 are best shown and described with relation to the enclosure base member 11 with reference to the views of FIGS. 2 and 3.

Assembly 18 includes a metallic tubular insert member 20 having a through bore for receiving electrical conductors (not shown), and defining an area 21 spaced inwardly of the distal end of reduced outer diameter defined by the shoulder 23 for purposes hereinafter explained. At the inner end of the insert 20, there is provided a laterally extending flange 22, preferably of non-circular cross section. In the preferred embodiment, this flange 22 is rectangular in configuration and arranged to be seated in an elongated groove 25 formed in the base 11 and having upstanding sides 26 which act in conjunction with the flange 22 to provide a rotational stop means for the insert 20. As will be observed from FIG. 3, the tubular insert 20 extends through an aperture 30 formed in the supporting end wall 31 of the base member 11. The end wall 31 is formed with a continuous groove 32 encircling the aperture 30. A flat boss 33 defined by the aperture 30 and the groove 32 extends outwardly from the enclosure base member 11 for supporting the hub member 38. Although the flange 22 and the groove 25 provide a most desirable rotational stop means, particularly where relatively large torsional forces are introduced, it is conceivable that an insert (not shown) with an irregular peripheral cross section may be seated in an aperture of like cross section, where molding practices and lesser torsional forces permit.

Figure 3:
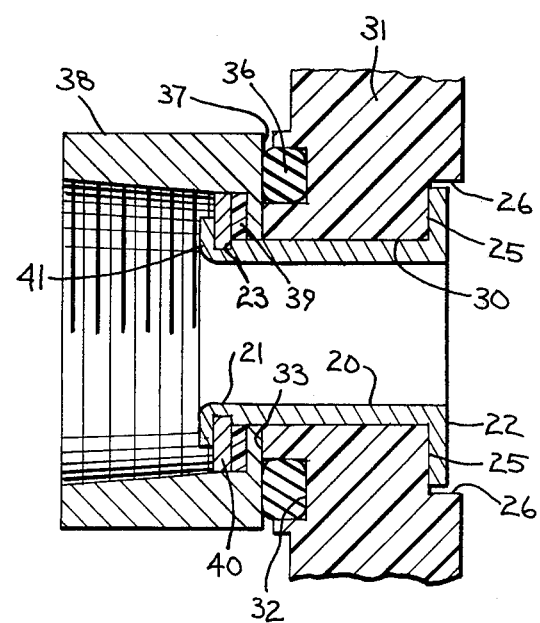
FIG. 3 is a fragmentary side elevational view, in section, of a portion of the body member and of the hub assembly constructed in accordance with the concepts of the invention.

A compressible, resilient sealing ring 36 is arranged to be seated in the groove 32 and has a portion of its cross section extending outwardly of the groove which portion may be compressed to the configuration shown in FIG. 3. This compressed state provides sealing engagement with the exposed end wall surface 37 of a hexagonal hub or coupling member 38 with the supporting end wall 31 upon assembly of the hub to the enclosure. Also disposed between inner wall surface of the hub 38 and metal washer 40 is a washer 39 of a material having a low coefficient of friction with respect to the material of the hub member 38 and the metallic washer 40. A very satisfactory material has been found to be Teflon (tetrafluoroethylene). This low coefficient of friction enables the hub 38 to be rotated with respect to the end wall 31 with minimal torsional forces being introduced between the components of the hub assembly 18 and the enclosure 10. The washer 40 is disposed between the shoulder 23 of the insert 20 and the laterally extending lip 41 formed at the distal end of the reduced diameter portion 21 of the tubular insert 20. The lip 41 serves to retain the components of the hub assembly 18 in assembled position relative to the enclosure 11. The lip 41 may be formed by a cold forming operation, such as conventional spinning techniques, following assembly of the hub components. The boss 33 serves to prevent the sealing ring 36 from being overly compressed during this lip forming operation.

It will be observed that the present invention has provided a novel means for releasably joining a conduit to an enclosure of polymeric or plastic resin material. A hub assembly with a minimal number of components provides the desired sealing characteristics and permits a tight threaded fit without introducing excessive torsional strain during the connecting operation. Enclosures of polymeric materials have only recently been introduced for use in housing electrical components. Unfortunately, although the departure from the usual metallic enclosures has introduced many advantages, until the introduction of the present assembly, these advantages have been somewhat obscured because of the difficulty of connecting an enclosure to a conventional conduit member. The present concept permits the use of the non-metallic enclosures in conventional installations without sacrifice of the many attributes of these devices.

The embodiments of the invention of which an exclusive property or privilege is claimed are defined as follows:

1. In a non-metallic enclosure for housing an electrical device including an apertured, supporting end wall, an assembly for connecting a tubular conduit to the apertured end wall comprising in combination:
   a tubular insert seated in the end wall aperture and including a non-circular flanged portion arranged to be seated in a non-circular recessed area of the inner wall surface of said supporting end wall to prevent rotation of said insert with respect to said enclosure, and having a portion extending in a longitudinal plane outwardly of said end wall;
   a rotatable, hollow, internally threaded hub member having an aperture inturned end wall, said apertured end wall being received and supported by the externally extending portion of said tubular insert, and the distal end of said extending portion being formed with a hub-retaining lip extending laterally relative to the longitudinal axis of said insert; a first washer member received by the externally extending portion of the tubular insert and seated between the inner surface of the apertured end wall of said hub member and said hub-retaining lip, and a second washer member received by the externally extending portion of the tubular insert and seated internally of the hollow hub between the hub-retaining lip of said tubular insert and the said first washer member, said first washer member being formed of a material having a relatively low coefficient of friction with respect to the material of said second washer member and the material of said inturned end wall of said hub member.

2. The assembly of claim 1, wherein the material of said first washer member is polytetrafluoroethylene.

3. The assembly of claim 1, wherein the externally extending portion of the tubular insert has an area of reduced external cross section area defining a laterally projecting shoulder spaced inwardly of said hub-retaining lip and arranged to restrict axial inward movement of said second washer member.

* * * * *